Aug. 6, 1940.　　　　F. V. MOORE　　　　2,210,174
RODENT TRAP
Filed Oct. 9, 1939　　　3 Sheets-Sheet 1
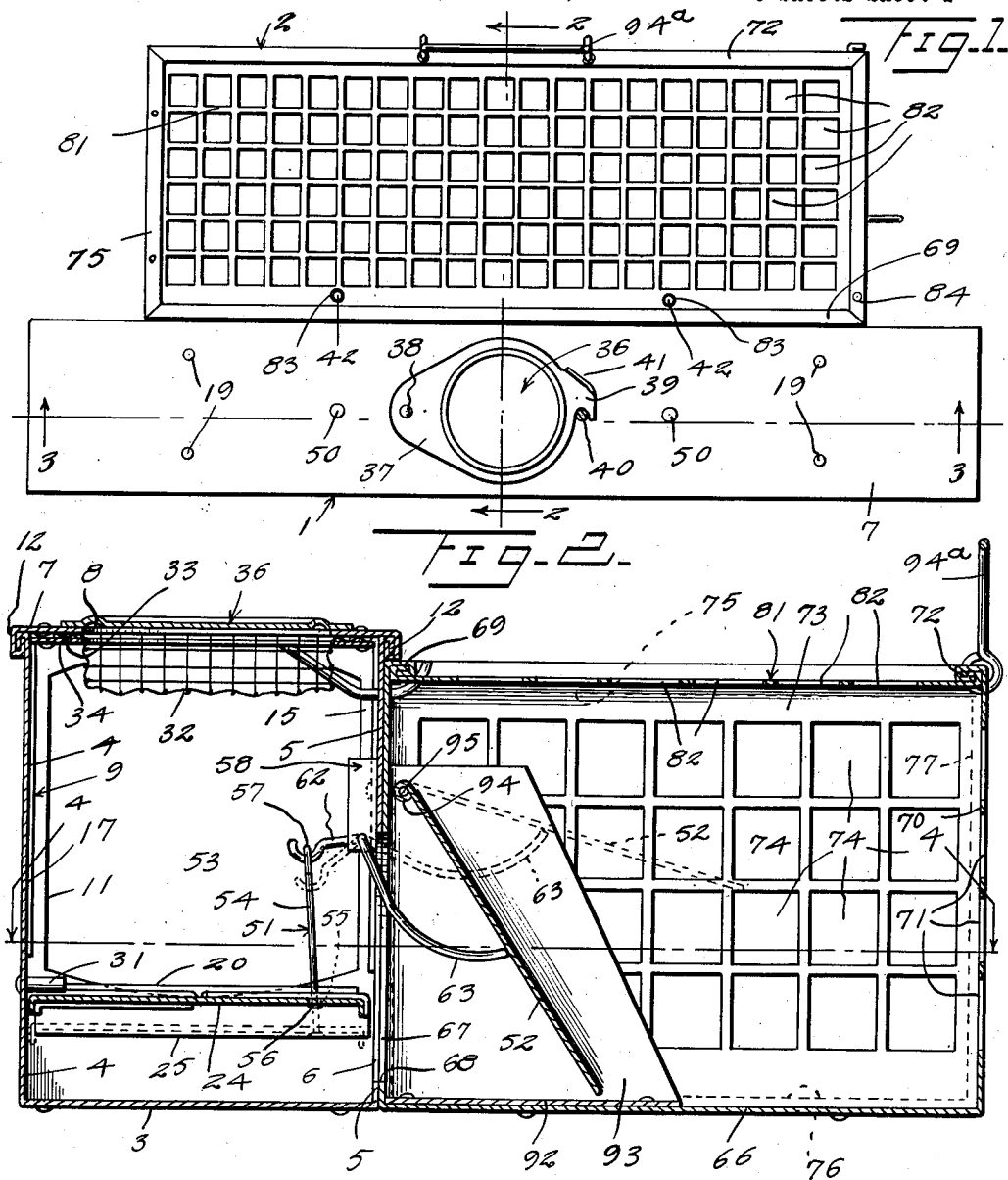
Inventor
F. V. Moore
By Kimmel & Crowell
Attorneys

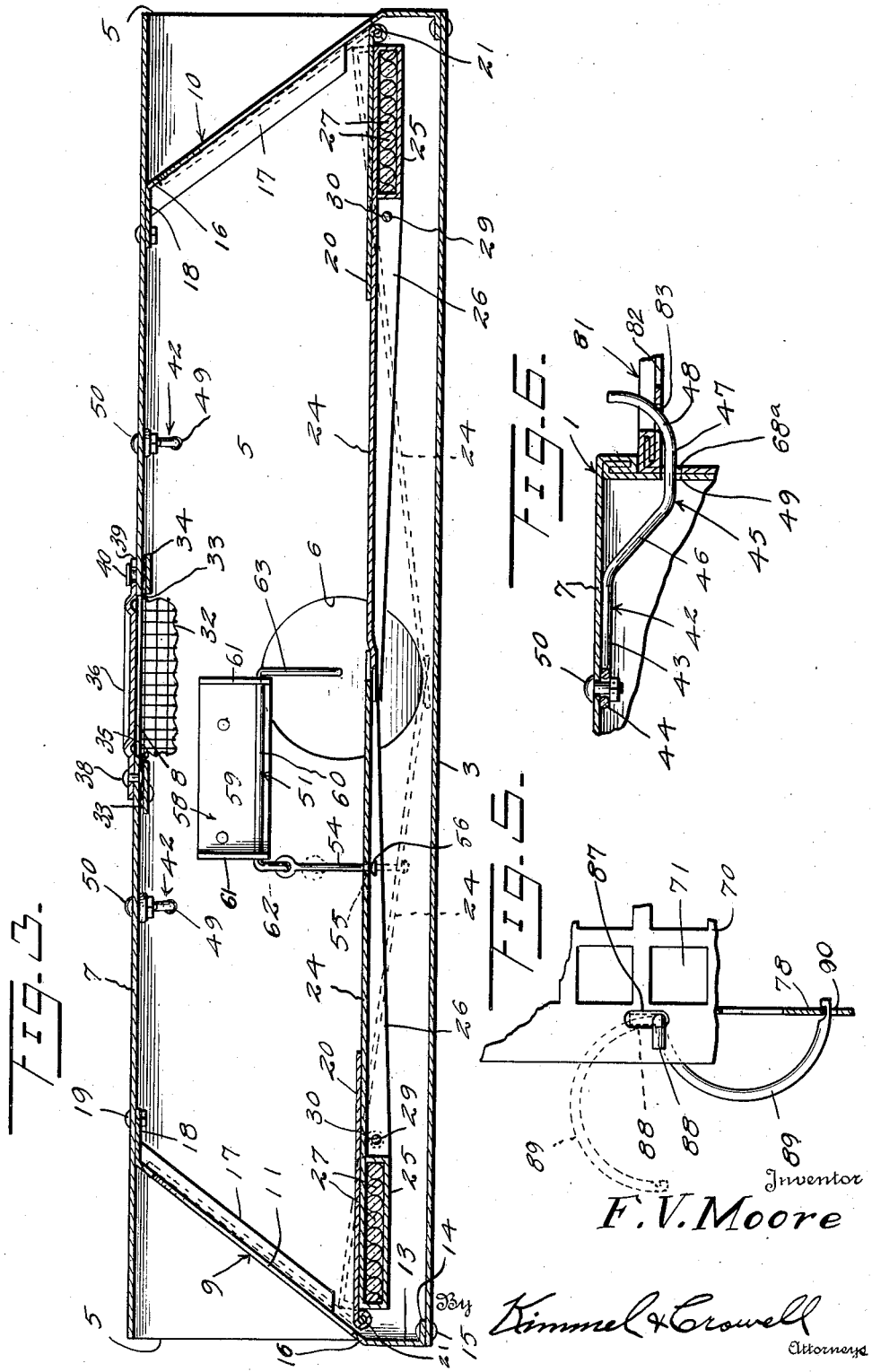

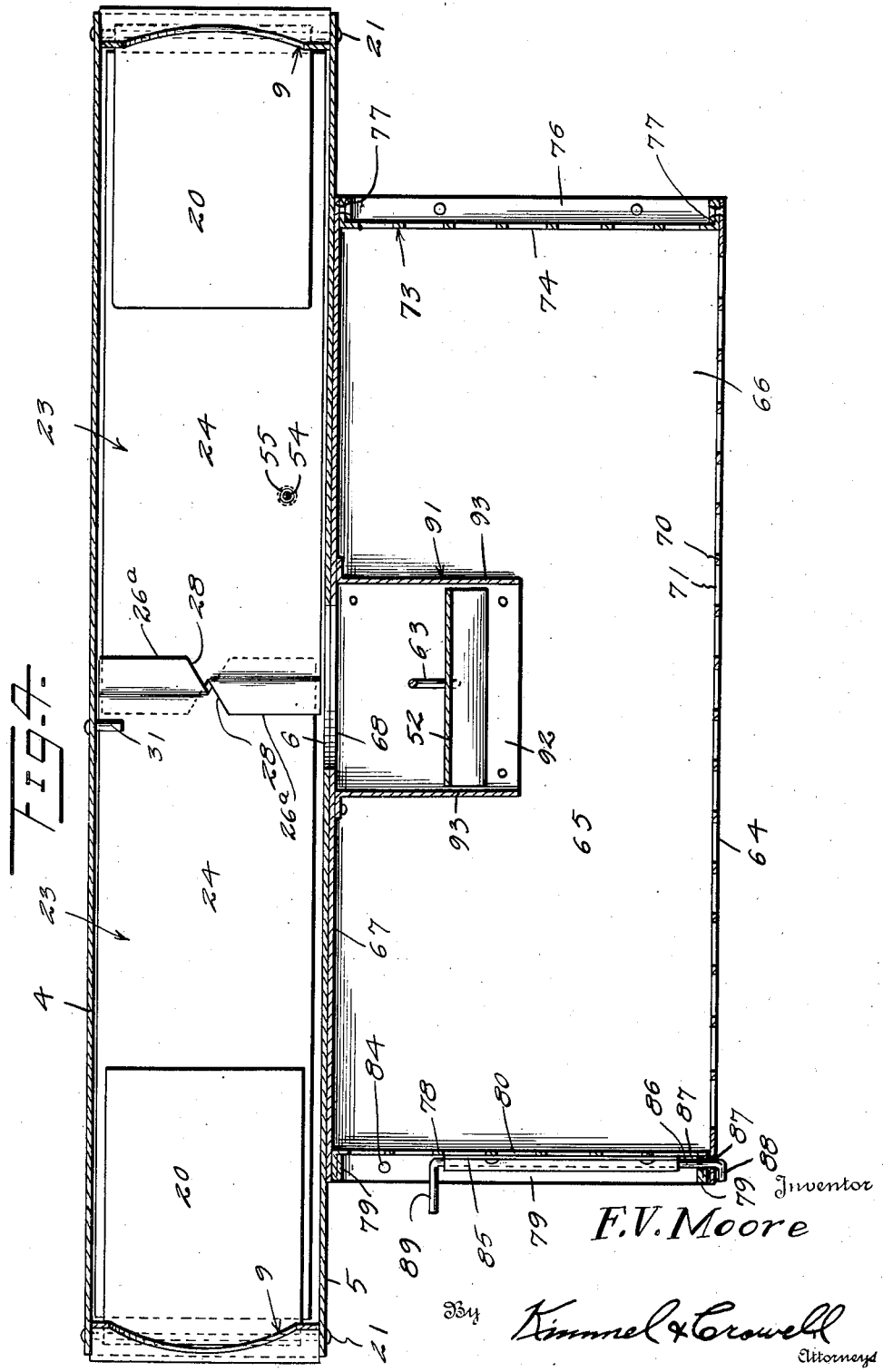

Patented Aug. 6, 1940

2,210,174

UNITED STATES PATENT OFFICE 2,210,174

RODENT TRAP

Frank V. Moore, Holton, Kans.

Application October 9, 1939, Serial No. 298,695

9 Claims. (Cl. 43—67)

This invention relates to a rodent trap designed primarily for the trapping of rats, but it is to be understood that a trap, in accordance with this invention is adapted to be employed in connection with the trapping of any type of rodents for which it may be found applicable.

The invention aims to provide, in a manner as hereinafter set forth, a trap of the class referred to including gravity control means for automatically setting it after a trapping operation.

The invention further aims in the providing of a trap of the class referred to including a normally open runway structure and a trapping structure for communicating with and normally closed to the runway structure and with said structures including correlated means adapted to be shifted by the weight of a rodent when it travels in the runway structure whereby said means will act for closing the runway structure and opening the trapping structure and with said means further automatically acting to open the runway structure and close the trapping structure after the rodent is trapped in the latter.

The invention further aims in the providing of a rodent trap with a runway structure in which the rodent travels, said structure including end walls provided with normally open entrances, doors operating in unison for closing said entrances and means correlated with the doors for shifting them to close and open said entrances, when the rodent respectively travels on said means and off said means to enter a trapping structure.

The invention further aims in the providing of a rodent trap including a trapping structure having a normally open entrance, a normally elevated opened automatically releasable door for closing said entrance after a rodent enters such structure and means within the structure and correlated with the closed door to prevent the rodent from shifting the latter to open position.

The invention further aims in the providing of a rodent trap with a runway structure for the rodent including a pair of entrances, a pair of normally inactive shiftable doors for closing said entrances and a pair of connected together balanced pivotally mounted normally inactive shifting elements for the doors in the form of tread members actuated in unison by the weight of a rodent when it travels on either one of the elements thereby shifting the doors to close said entrances, and with said elements and doors automatically returnable to inactive position after the rodent passes off the elements into a trapping structure.

The invention further aims in the providing of a trap of the class referred to including a runway structure and a trapping structure and with said structures so related whereby when the rodent is trapped by the trapping structure, the latter may be disconnected from the runway structure and submerged in a body of water for drowning the rodent, after which the rodent may be discharged from the trapping structure without touching it with the hands of a person.

The invention further aims in the providing of a rodent trap with a runway structure into which the rodent travels, the said structure including end walls having normally open entrances and automatically shiftable doors acting to close and open said entrances respectively when a rodent enters said structure and leaves the latter to enter a trapping structure.

The invention further aims in the providing of a trap for the purpose set forth, which is comparatively simple in its construction, strong, durable, compact, readily assembled, thoroughly efficient in its use, and inexpensive to manufacture.

Embodying the aims aforesaid and others which may hereinafter appear, the invention consists of the novel construction, combination and arrangement of parts as will be more specifically described and illustrated in the accompanying drawings wherein is shown an embodiment of the invention, but it is to be understood that changes, variations and modifications may be resorted to which fall within the scope of the invention as claimed.

In the drawings:

Figure 1 is a top plan view of the trap when in set position,

Figure 2 is a section on line 2—2, Figure 1, looking in the direction of the arrows, Figure 3 is a section on line 3—3, Figure 1, looking in the direction of the arrows, Figure 4 is a section on line 4—4, Figure 2, looking in the direction of the arrows, Figure 5 is a fragmentary view in sectional plan of the trapping structure, and Figure 6 is a sectional detail illustrating the form of the couplers employed between the runway structure and the trapping structure of the device.

The trap includes a runway structure and a trapping structure generally indicated at 1, 2 respectively detachably connected together by a means to be referred to. The structure 2 is arranged against the front wall of and is of less length and height than the structure 1, but of greater width than the latter. The ends of structure 2 are disposed inwardly of and spaced equidistant from the ends of structure 1.

The structure 1 includes a tunnel-like body formed of a closed bottom 3, a closed rear side wall 4, a front wall 5 provided centrally and in the lower portion thereof with a circular opening 6 constituting an outlet for such structure, a top wall 7 formed centrally thereof with a circular opening 8, and a pair of oppositely disposed end walls 9, 10 of like form each having an enlarged cutout 11 to provide an entrance for the runway formed by said tunnel-like body. The bottom 3 and the walls 4, 5 are formed from one piece of sheet metal bent into substantially U-form and having a straight bight. The top wall 7 is formed of a single length of sheet metal provided with depending flanges 12. The wall 7 seats on the top edges of the walls 4, 5 and has its flanges arranged against and are suitably secured to the upper lengthwise marginal portions of the outer faces of the walls 4, 5. The ends of the bottom 3 and walls 4, 5 and 7 align.

Each of the end walls includes a vertical lower part 13 having its bottom formed with a rearwardly extending flange 14 which seats on the upper face of and is secured to the bottom 3 by the hold-fast means 15 and an upstanding rearwardly inclined upper part 16 which is of greater length than the lower part 13 and extends to the lower face of the top 7. The cutout 11 is formed in the said part 16. The latter at its sides are provided with rearwardly directed flanges 17 which bear against the inner faces of the walls 4, 5. The upper end of the part 16 has extending rearwardly therefrom a flange 18 which bears against the lower face of and is secured to the top wall 7 by the holdfast devices 19. The flanges 17 merge into the flange 18. The part 16 constitutes what may be termed a combined door frame and abutment. The part 13 is substantially flush with an end of the tunnel-like body.

The structure 1 includes a pair of oppositely disposed doors 20 for opening and closing the entrances 11. The top and bottom edges of the entrances are of arcuate contour and oppositely disposed. The doors 20 are of greater length and width than the entrances 11, but are of less width than the parts 15 of the end wall. Each door 20 operates between the side flanges 17 of the part 16 of an end wall. The doors 20 at their lower ends are pivotally mounted on shafts 21 disposed transversely of the tunnel-like body in proximity to and rearwardly of the points of mergence between the parts 13 and 16 of the end walls. The shafts 21 are arranged above the bottom 3, extend through, supported by and connected to the walls 4, 5. The lower ends of the doors 20 are provided with barrels 22 through which extend the shafts 21. The doors 20 are formed of sheet metal and when in open position relative to entrances 11 are disposed horizontally and within and lengthwise of the tunnel-like body as shown by Figure 3. When the doors are in closing relation with respect to the entrances 11 they will appear as indicated in dotted lines Figure 3. The doors are automatically shifted to a position in closing relation with respect to the entrances 11 and move to inactive position or in non-closing relation with respect to the entrances 11 by gravity. When the doors are shifted or moved to abut the parts 16 of the end walls the tunnel-like body will be closed to the entrance of a rodent and when in such position they prevent the rodent from passing from the tunnel-like body with the exception of through the opening 6 and this will be more fully referred to.

The structure 1 includes a pair of oppositely disposed interengaging overlapping normally balanced simultaneously actuated shiftable elements 23 for shifting the doors 20 in unison to simultaneously close the entrances 11. The elements 23 are of like construction and each is in the form of a tread member. Each of the elements 23 is formed from a length of sheet metal bent to provide an elongated rectangular platform 24 of greater length than, arranged under, disposed parallel to and extending rearwardly from the non-hinged or pivoted end of the door when the latter is in its non-closing position, a closed weighting or balancing means receiving chamber 25 arranged below the outer end terminal portion of and of materially less length than the platform, side flanges 26 depending from the lengthwise edges of the platform, weighting or balancing means 27 within the chamber 25, a V-shaped notch 28 at the inner end edge 26 of the platform, a pair of aligned openings 29 in the flanges 26 rearwardly of and in proximity to the inner end of chamber 25, and a fulcrum rod 30 extending through the openings 29 and secured to the walls 4, 5. Although the weighting means 25, which is employed for normally balancing the platform 24 is shown as consisting of a series of separate weights of circular cross section, yet it is to be understood that such means may be as desired. The platforms 24 of the elements 23 are connected together at their inner terminal portions to provide for the elements 23 operating in unison. This connection is provided by the V-shaped notches 28 which permit of the inner end terminal portions of the platforms interengaging in alternate overlapping relation, and as the said end terminal portions will possess V-notches of the desired length they will always be slidably connected together, whereby when one element 23 is made active the other will also be. Secured to and exending inwardly from the rear wall 4 is a stop 31 arranged over and coacting with one of the platforms 24 to limit the extent of the upward movements of the platforms when the elements 23 are returned to balanced position by the weighting or balancing means 27.

The structure 1 includes an open top bait basket 32 of reticulated material which is arranged in depending relation with respect to the inner face of top wall 7. The basket 32 includes at its top an outwardly directed annular portion 33 which bears against the inner face of top wall 7 and borders throughout and extends laterally from the edge of the opening 8. Positioned against the lower face of said portion 33 and anchored to wall 7 is a means 34 which clamps the said portion 33 to the lower face of the wall 7 to thereby suspend the basket 32. The means 34 is formed with an opening 35 which substantially aligns with the opening 8 in the wall 7. The structure 1 includes a shiftable pivoted closure 36 for the open top of the basket 32. The closure 36 has a lateral extension 37 at one side which is pivotally mounted on an upstanding pivot member 38 secured to the top wall 7. The part 38 provides means for connecting the closure upon the top of the tunnel-like body. The opposite side of the closure 36 is formed with a laterally extended notched latching member 39 for correlation with a keeper 40 for retaining the closure in closing relation to the open top of the bait basket 32 to normally prevent access from the exterior of structure 1 to the bait contained in the basket 32. The closure 36 is formed with an upstanding ear 41 to facilitate the shifting of it to and from closing relation with respect to the open top of the bait basket. The keeper 40 is secured to and extends upwardly from wall 7.

The structure 1 includes a pair of coupling members 42 for detachably connecting structure 2 to structure 1. The members 42 are of like form, disposed in parallel spaced relation, arranged outwardly in proximity to the extension 37 and pivot 38 of the latching member 39 of the closure 36. Each coupling member 42 (Figure 6) is formed of a metallic rod of the desired length and gage bent to provide a horizontally disposed inner end part 43 having its inner terminous in the form of a loop 44, an intermediate part 45 having a downwardly inclined outwardly directed portion 46 and a horizontal portion 47 and an upwardly directed outwardly curved outer end part 48. The outer end of part 43 merges into the upper end of portion 46, the lower end of portion 46 merges into the inner end of portion 47 and the lower end of part 48 merges into the outer end of portion 47. The part 43 is arranged within the tunnel-like body and positioned against the inner face of wall 7, the portion 46 is arranged within said body, a part of the portion 47 is arranged in said body and the remaining part of such portion 47 extends through an opening 49 in wall 5 to position the part 48 forwardly of the wall 5. The inner end parts 43 of the members 42 are secured against the inner face of wall 7 by holdfast means 50 extending through the looped inner end termini of the parts 43 and the wall 7. The said holdfast means 50 being of the clamping type and bearing against the lower face of the loops 44 and the upper or outer face of the wall 7. The manner in which the members 42 are correlated with the structure 2 for detachably coupling it to the front wall of the structure 1 will be hereinafter referred to.

The structure 1 includes a normally inactive shifting mechanism 51 for correlation with the normally closed door 52 of the trapping structure and which when active will shift said door 52 to open position to permit of the rodent passing from tunnel 53 through opening 6 into the structure 2 for the purpose of trapping the rodent. The mechanism 51 includes an upstanding link 54 normally inclined from the vertical from its upper to its lower end and which loosely passes through an opening 55 in a platform 24 and is formed with a head 56 on its lower end engageable by the said platform 24 when the inner end of the latter is lowered whereby the link will be moved therewith downwardly, a loop 57 on the upper end of link 54, a yoke shaped bracket 58 having its bight 59 secured to the inner face of wall 5 and which is laterally offset with respect to opening 6, a rock shaft 60 loosely journaled in the arms 61 of bracket 58 and extended laterally from such arms, a rearwardly extending hook-like crank arm 62 on one end of shaft 60 for correlation with the loop 57 for loosely connecting the link 54 to shaft 60, and a downwardly and forwardly directed curved crank arm 63 on the other end of shaft 60 normally bearing against the door 52 as shown by full lines, Figure 2. The crank arm 63 passes through the opening 6 into structure 2 and its action relative to the door 52 will be more fully referred to. Preferably the link 54 will be loosely connected to that platform 24 that does not have the stop 31 arranged directly thereover.

The structure 2 is in the form of a receptacle 64 which provides a chamber 65 in which the rodent is trapped after it passes from the tunnel 53 through opening 6 into structure 2. The receptacle 64 includes an imperforate bottom 66, a rear wall 67 formed with a circular opening 68, a forwardly directed flange 69 at its upper end, a pair of spaced aligned openings 68ª near its flange 69 and which merges at its lower end into the inner side of said bottom 66, a front wall 70 having the major portion thereof formed with cutouts 71, merging at its lower end into the outer side of said bottom and formed at its top with a rearwardly directed flange 72, a stationary end wall 73 having the major portion thereof provided with cutouts 74, an outwardly extending flange 75 at its top, an outwardly extending flange 76 at its bottom and outwardly extending flanges 77 at its sides, a hinged or pivoted end wall 78 formed with outwardly directed flanges 79 at its top, bottom and sides and having the major portion thereof formed with cutouts 80 and a top wall 81 having the major portion thereof formed with cutouts 82 and provided in proximity to its inner side edge with a pair of spaced aligned openings 83.

The stationary end wall 73 has its side flanges 77 bearing against the inner faces of and suitably secured to the walls 67, 70, its top flange against the lower face of and suitably secured to the top wall 81 and its flange 76 bearing against the upper face of and suitably secured to bottom 66. The hinged end wall 78 is inset with respect to corresponding ends of and has its flanges 79 bearing against the said bottom and said front, rear and top walls. The top wall 81 when arranged in relation to the front, rear and side walls of the receptacle is not only overlapped and secured to top flange of wall 73, but it is also overlapped and crimped to the flanges 69, 72.

The hinged or pivoted end wall 78 is mounted on vertically disposed aligned pivot members 84 secured to the bottom 66 and the top wall 81. The top and bottom flanges of wall 78 have the members 84 extending therethrough. When the wall 78 is closed it frictionally engages the front, top and rear walls and the bottom of the receptacle 64. There is correlated with the wall 78, which also constitutes a door for the receptacle 64 a latching means consisting of a combined retaining and bearing forming plate 85 secured against the outer face of wall 78, a horizontally shiftable shaft 86 revolubly mounted in and extended laterally in opposite directions from plate 85, a pair of slots 87 in registry, one formed in the outer side flange of wall 78 and the other in the wall 70 in proximity to one end thereof, a latching nose 88 on the outer end of shaft 86 coacting with the outer face of wall 70 for latching the wall 78 closed, and a curved handle member 89 on the inner end of shaft 86. To prevent the accidental turning of shaft 86 when the nose 88 is in latching position the wall 78 is formed with an opening 90 into which is adapted to be inserted the outer end of member 89.

The structure 2 includes an upstanding yoke 91 arranged therein and which is positioned against the inner face of and secured to the wall 67 of the receptacle 64. The bight of yoke 91 is indicated at 92 and the arms or sides thereof at 93. The bight 92 is secured to the bottom 66 of the receptacle 64. The said arms 93 having vertical rear edges and front edges inclining forwardly from their upper to their lower ends whereby the arms gradually increase in width downwardly. The length of the bight corresponds to the width of the arms at the bottom of the latter. The arms are positioned adjacent the sides of the opening 68.

Rotatably mounted, at its upper end, as at 94 upon a shaft 95 is the door 52. The position of door 52 when acting to prevent a rodent from passing from structure 2 into structure 1 is at a downward and forward inclination relative to wall 67. The door 52 is arranged within the yoke 91. The shaft 95 is connected to the arms of the yoke 91 in proximity to the upper end of the latter and also in close proximity to the wall 67. The yoke 91 not only acts as a support for shaft 95, but forms a passageway leading from opening 6 into chamber 65 and further acts as a guard to prevent the rodent shifting door 52 from closed to open position after the rodent has been trapped in chamber 65.

The structure 2, when the trap is assembled is to have its wall 67 positioned against the wall 5 of structure 1 with the openings 6 and 68 in registry. The structures 1 and 2 are detachably connected together in the position aforesaid by the coupling member 42 extending through the openings 68ª in wall 67 and then up through the openings 83 in the wall 80.

The structure 2 includes a handle member 94ª which is loosely connected to the outer side of the wall 80 and the upper end of wall 70 (Figure 2).

The doors 20 as well as their shifting elements, and the door 52 and its shifting mechanism will be of aluminum, so it requires but a little effort to operate them, more especially with respect to the doors, and the tunnel-like body and the receptacle 64 will be of galvanized iron and under such conditions there is nothing to corrode or rust.

The trap is to be set with the runway structure next to the wall (where the rat always has its run) and if desired it may be covered over entirely with boards, rubbish or in fact most anything that will conceal the trap, without interfering with anyone of its working parts. When the rat enters the runway, the shifting elements for the doors 20 do not yield until the rat has passed entirely off of a door 20, as the weight of the rat serves to keep the trap set until it passes off of a door 20, and as soon as the rat is off of the door his weight causes the doors shifting elements to lower at their inner ends whereby the outer ends of such elements will move upwardly carrying the doors 20 therewith to close the entrances 11. As the inner ends of the doors shifting elements are lowered, the shifting mechanism for the door 52 will be operated, and on the operation of such mechanism the door 52 will be moved from its closing position to an extent whereby communication is established between the structure 2 and structure 1 through the openings 6 and 68. When the inner ends of the shifting elements for the doors 20 lower and the doors 20 swing to closing relation with respect to the entrances 11 to the runway, the rat will no doubt realize that it is trapped and with the door 52 to chamber or compartment 65 standing open in his fright he will jump for the first opening (openings 6 and 68) and enter through the latter into the chamber 65. As soon as the rat passes off of the shifting elements for the doors 20 the trap automatically sets itself. The automatic opening of the doors 20 is had before the door 52 drops to closing relation with respect to chamber 65, as the shiftable parts of the shifting mechanism for door 52 are loosely connected together and such shifting mechanism is loosely connected to one of the shifting elements for the doors 20, and by this arrangement the door 52 does not drop on the rat which otherwise might cause the rat to try to back out. The construction and arrangement of the shiftable parts of the trap is such that the door 52 does not drop to normal position until the rat has passed into chamber 65.

The trap possesses an important advantage, which is a trapped rodent may be disposed of without the risk of it getting away. In this connection the structure 2, with the trapped rodent therein is disconnected from structure 1 and immersed in a vessel containing a body of water until the rodent has been drowned, after which the structure 2 is removed from said vessel and the wall or door 79 of structure 2 is opened and the rodent discharged without touching it with the hands. The member 94 facilitates the handling of the structure 2 during the drowning of the trapped rodent and the discharge of the latter from structure 2.

What I claim is:

1. In a trap for rodents, a structure providing a runway for a rodent, said structure having entrances for the runway, normally inactive doors for closing said entrances and an egress for the rodent, means providing a trapping chamber having an ingress aligned with said egress and a normally active guard means including a normally active lowered closure disposed in juxtaposition to said ingress to prevent the escape of a trapped rodent from said chamber, a rockable device including a shaft pivotally suspended in said structure and arms at the ends of the shaft disposed in angular relation, one of said arms being formed with a curved extension disposed at an angle thereto, passing through said egress and ingress into said guard means and engaging said closure, a vertically disposed member loosely connected at its upper end to the outer end of the other of said arms, and depressible means slidably connected to said member, pivotally suspended in said structure, disposed in juxtaposition to said doors and capable of being depressed by the weight of a rodent thereon, structure to thereby shift the doors to close said entrances and for lowering said member to rock said device in a direction to shift said extension to elevate said closure to thereby establish communication between the trapping chamber and said structure.

2. In a trap for rodents, a runway structure, a normally closed trapping structure having a side wall disposed in juxtaposition to a side wall of the other structure, said structures including correlating means for establishing communication between them through said walls, and spaced couplers secured within the runaway structure to the top of the latter and having offset parts extending through said walls and the top of the trapping structure for detachably connecting the latter to the runway structure.

3. In a trap for rodents, a runway structure in the form of a tunnel-like body including a bottom, a top wall, a pair of side walls and a pair of end walls, each of said end walls being arranged between the ends of the other of said walls and formed of a vertical lower portion and an upstanding upper portion inwardly inclined throughout with respect to said lower portion provided with an inwardly directed upper flange, a pair of inwardly directed side flanges and an enlarged opening constituting an entrance to said body, the said upper flange and the said side flanges bearing respectively against the lower face of the said top wall and the inner faces of the said side walls, means for securing the flanges of said lower portions to said bottom, and means for securing the said upper flanges to the inner face of said top wall.

4. In a rodent trap, a runway structure including a top, a pair of side walls, a pair of end walls and a bottom, a normally closed trapping structure including a top, a pair of side walls, a pair of end walls and a bottom, one of the side walls of one structure abutting one of the side walls of the other structure, the other side wall, the end walls and the top of said trapping structure being of lattice-like form, a pair of spaced couplers within and secured to the top of the runway structure, said couplers including offset curved portions extending through said abutting side walls into the trapping structure and up through the top of the latter for detachably connecting the structures together, said structures including normally stationary oppositely shiftable correlated parts for normally closing communication between said structures and provided when shifted in one direction for establishing communication between said structures.

5. In a rodent trap, a runway structure, a normally closed trapping structure disposed in juxaposition to and for communication with the runway structure, spaced couplers fixedly secured within and having depending offset parts extending outwardly through a side wall of said runway structure, said offset parts including upstanding curved portions extending through a side wall of and into said trapping structure and upwardly through the top of the latter to thereby removably connect the trapping structure to the runway structure, and a handle secured to the top of and in proximity to the other side wall of the trapping structure.

6. In a rodent trap, a runway structure including a front wall, a normally closed trapping structure disposed in juxtaposition at its rear to said front wall and for communication with the runway structure through said front wall, said trapping structure including bottom, rear, front, top and a pair of end walls, spaced couplers fixedly secured within and having depending offset parts extending outwardly through said front wall of said runway structure, said offset parts including upstanding curved portions extending through said rear wall of and into said trapping structure and upwardly through said top wall of the latter to thereby removably connect the trapping structure to the runway structure, a handle secured to said front and top walls of the trapping structure, one of the end walls of said trapping structure being arranged between the rear, front, top and bottom walls of such structure, hinged to said top and bottom walls and constituting a gate, and a rotatable shaft journaled on said gate and formed at one end with an angularly disposed curved arm, engaging with the gate to arrest rotation of the shaft and means at its other end releasably engaging with said front wall of the trapping structure for latching the gate closed.

7. In a rodent trap of that type including a runway structure, a normally closed trapping structure and with said structures having walls thereof disposed in juxtaposition, the combination of a pair of spaced holdfast devices adapted to be connected to the top of and depending in said runway structure, and a pair of coupling elements for detachably connecting the trapping structure to the runway structure, each of said elements including a horizontal part anchored at one end to a holdfast device, a depending outwardly inclined part integral at its upper end with the other end of said horizontal part and an up-curved outwardly directed part integral at its inner end with the lower end of said inclined part, said curved parts for extension through said walls disposed in juxtaposition into the trapping structure and up through the top of the trapping structure whereby the latter is detachably connected to the runway structure.

8. In a rodent trap of that type including a runway structure, a normally closed trapping structure, said structures including walls disposed in juxtaposition, the combination of a pair of spaced holdfast devices adapted to be connected to the top of and depending in said runway structure, and a pair of coupling elements fixedly secured to said runway structure by said holdfast devices and having offset upwardly directed curved parts extending through said walls disposed in juxtaposition into said trapping structure and up through the top of the latter whereby it is removably connected to the runway structure.

9. In a trap for rodents, a tunnel-like body having normally open inwardly inclined entrances and a normally closed outlet between said entrances, a pair of oppositely extending normally horizontally balanced simultaneously shiftable platform-like elements arranged in the lower portion of said body and overlapped at their inner ends, said elements having V-shaped cutouts centrally of their inner terminal portions and having their outer terminal portions weighted, said cutouts providing for said inner terminal portions permanently slidably interengaging and permanently overlapping on the upper and lower faces of said inner terminal portions, means for pivotally supporting said elements from said body at a point between the transverse medians and outer ends of said elements, a pair of oppositely extending normally horizontally disposed closures for said entrances normally arranged in superimposed relation with respect to the outer terminal portions of said elements and shiftable in unison to close said entrances on the depression of the inner terminal portions of said elements, and means disposed outwardly of the outer ends of said elements, connected to said body and to corresponding ends of said closures for pivotally supporting the closures.

FRANK V. MOORE.